(12) United States Patent
Schuster et al.

(10) Patent No.: US 11,274,424 B2
(45) Date of Patent: Mar. 15, 2022

(54) DETACHABLE FAUCET CONNECTOR

(71) Applicant: Danco, Inc., Irving, TX (US)

(72) Inventors: Michael J. Schuster, Shorewood, IL (US); Douglas C. Saunders, Wadsworth, IL (US)

(73) Assignee: Danco, Inc., Irving, TX (US)

( * ) Notice: Subject to any disclaimer, the term of this patent is extended or adjusted under 35 U.S.C. 154(b) by 388 days.

(21) Appl. No.: 16/106,631

(22) Filed: Aug. 21, 2018

(65) Prior Publication Data
US 2019/0063050 A1    Feb. 28, 2019

Related U.S. Application Data

(60) Provisional application No. 62/548,633, filed on Aug. 22, 2017.

(51) Int. Cl.
| | | |
|---|---|---|
| *E03C 1/084* | (2006.01) | |
| *E03C 1/086* | (2006.01) | |
| *F16L 33/22* | (2006.01) | |
| *F16L 37/48* | (2006.01) | |

(52) U.S. Cl.
CPC .............. *E03C 1/084* (2013.01); *E03C 1/086* (2013.01); *F16L 33/223* (2013.01); *F16L 37/48* (2013.01)

(58) Field of Classification Search
CPC ....... F16L 33/223; F16L 37/48; F16L 55/027; F16L 55/02745; F16L 55/07; E03C 1/084; E03C 1/086; E03C 1/108; C02F 3/14; C02F 3/20; A61M 3/025; B05B 7/0425

USPC ....... 285/5, 8, 396; 261/DIG. 22; 239/428.5, 239/425.5, 419.5
See application file for complete search history.

(56) References Cited

U.S. PATENT DOCUMENTS

| | | | | |
|---|---|---|---|---|
| 1,525,794 A | * | 2/1925 | Blake | ................................. 285/8 |
| 3,227,380 A | * | 1/1966 | Pinkston | ................. E03C 1/084 |
| | | | | 239/428.5 |
| 4,477,109 A | * | 10/1984 | Kleuver | ................... F16L 37/48 |
| | | | | 285/396 |
| 5,190,224 A | * | 3/1993 | Hamilton | |
| 5,385,533 A | * | 1/1995 | Coviello | ................... F16L 37/48 |
| | | | | 239/428.5 |
| 6,250,688 B1 | * | 6/2001 | Kirby | |
| 2003/0042337 A1 | * | 3/2003 | Liang | ...................... E03C 1/086 |
| | | | | 239/428.5 |
| 2007/0080241 A1 | * | 4/2007 | Mueller | ................... F16L 37/48 |
| | | | | 239/428.5 |
| 2013/0008980 A1 | * | 1/2013 | Grether | |
| 2016/0151135 A1 | * | 6/2016 | Sodo | ....................... F16L 37/48 |
| | | | | 285/8 |

FOREIGN PATENT DOCUMENTS

EP    0927850 A2 *   7/1999    ............. F16L 37/48

* cited by examiner

*Primary Examiner* — Matthew Troutman
*Assistant Examiner* — William S. Choi
(74) *Attorney, Agent, or Firm* — Thomas | Horstemeyer LLP

(57) ABSTRACT

A detachable faucet connector can be used with a faucet to allow easy connection of hoses to the faucet. The detachable faucet connector can include an aerator, a funnel, and a hose adapter. The aerator can connect to a faucet to replace the faucet's existing aerator. The funnel can be inserted in to the aerator prior to the installation of the aerator in the faucet. The hose adapter can be connected to the funnel. The hose adapter can be attached to a hose.

15 Claims, 18 Drawing Sheets

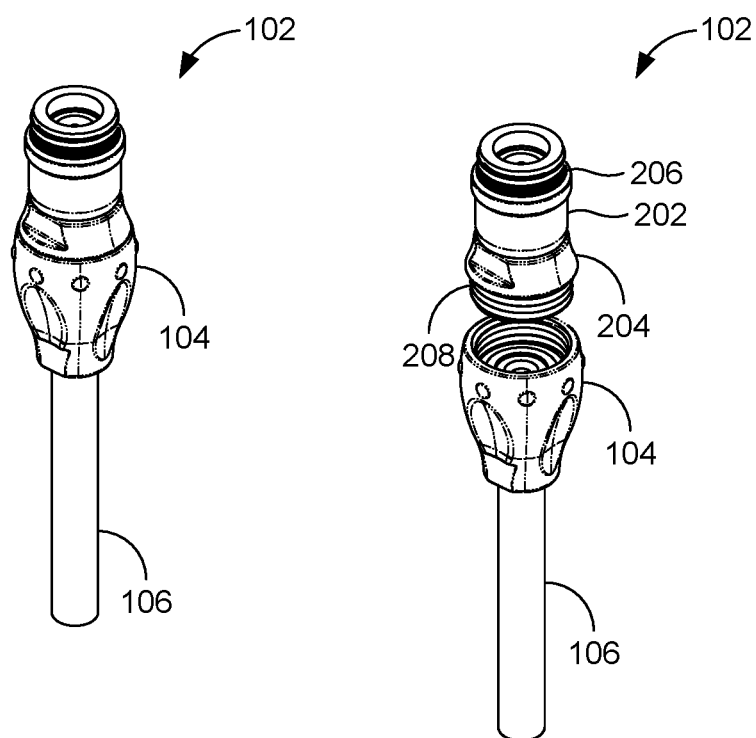
FIG. 2A
FIG. 2B
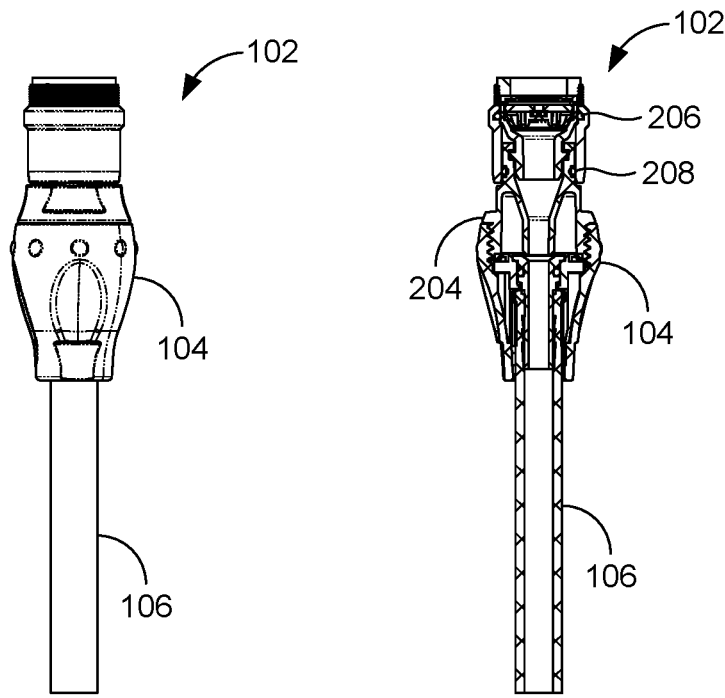
FIG. 2C
FIG. 2D

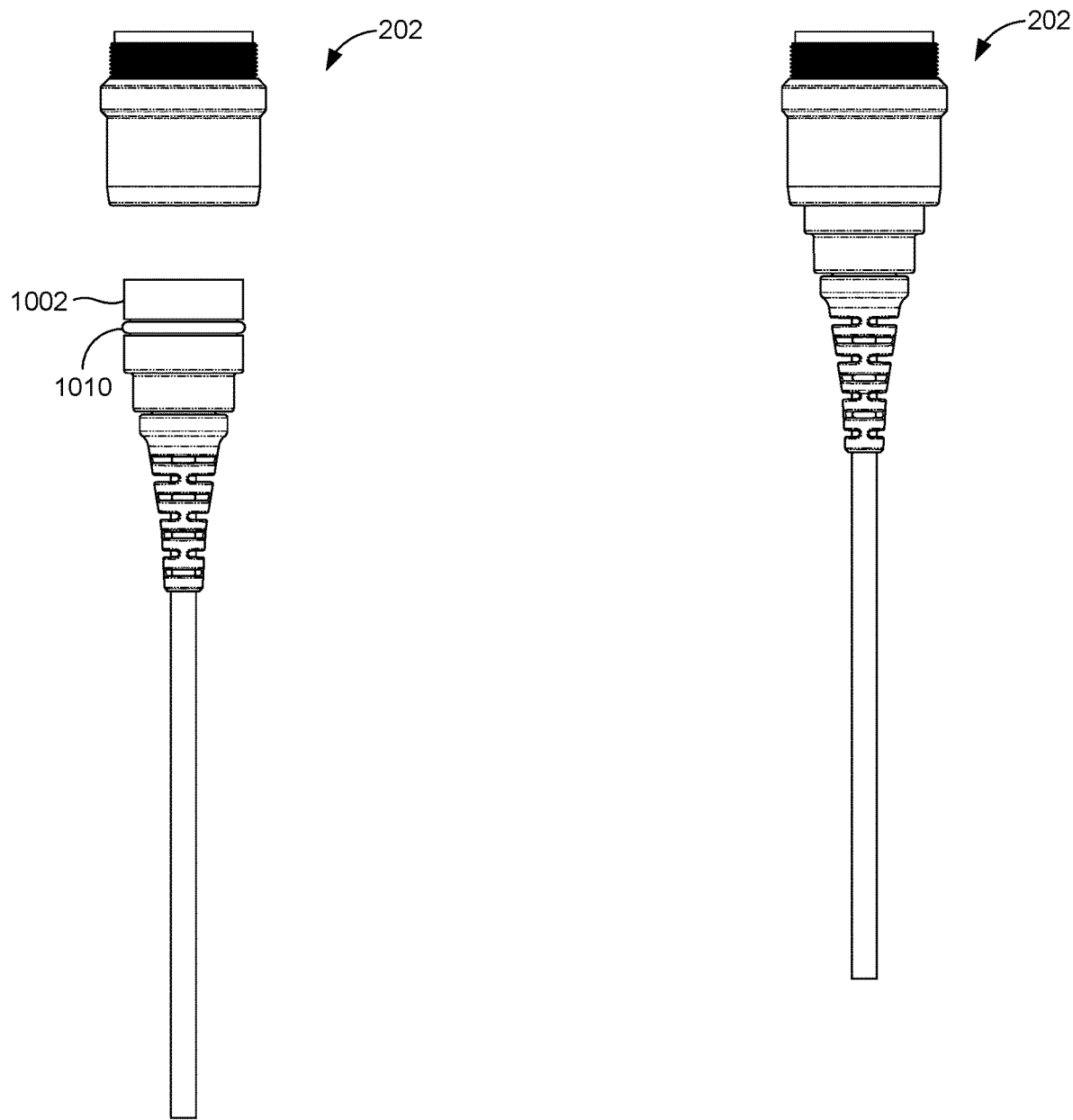
FIG. 11A                    FIG. 11B

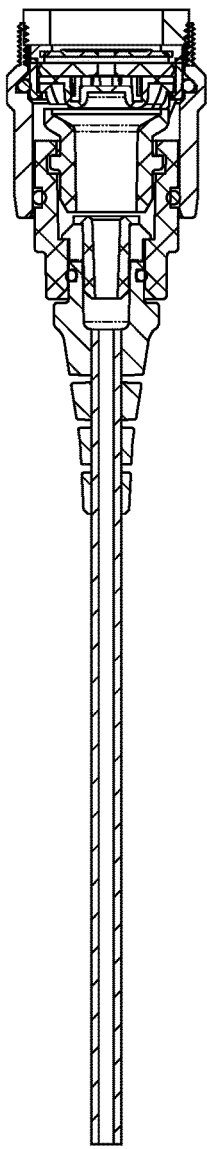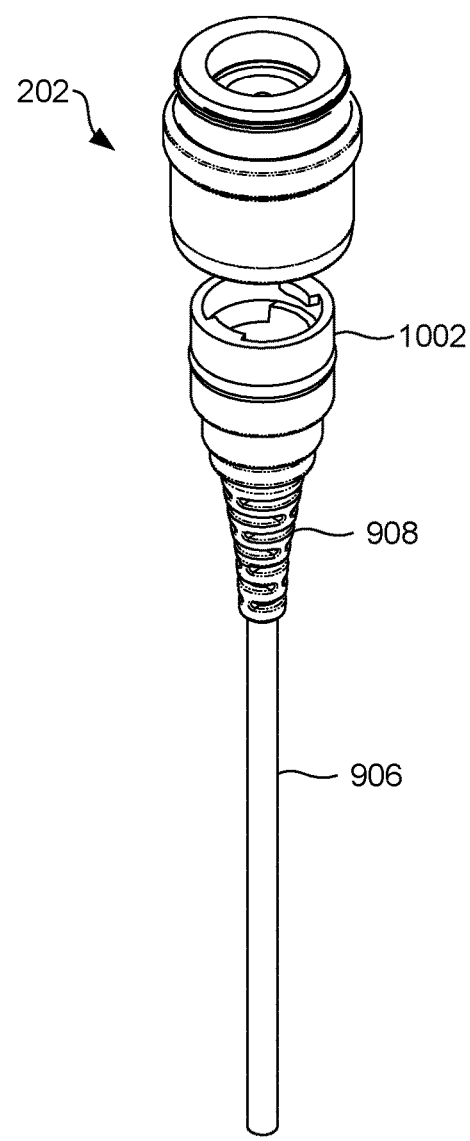
FIG. 11C
FIG. 11D

DETACHABLE FAUCET CONNECTOR

CROSS-REFERENCE TO RELATED APPLICATIONS

This application claims the benefit of U.S. Provisional Application No. 62/548,633, filed Aug. 22, 2017, the entire contents of which is hereby incorporated herein by reference.

BACKGROUND

Standard kitchen and bath faucets do not have a connection for attaching hoses and tubes to them.

BRIEF DESCRIPTION OF THE DRAWINGS

For a more complete understanding of the embodiments and the advantages thereof, reference is now made to the following description, in conjunction with the accompanying figures briefly described as follows:

FIGS. 2A-2D illustrate a representative detachable faucet connector according to various embodiments of the present disclosure.

FIGS. 11A-11D illustrate a detachable faucet connector connected to a hose according to various embodiments of the present disclosure.

Figure 1A:
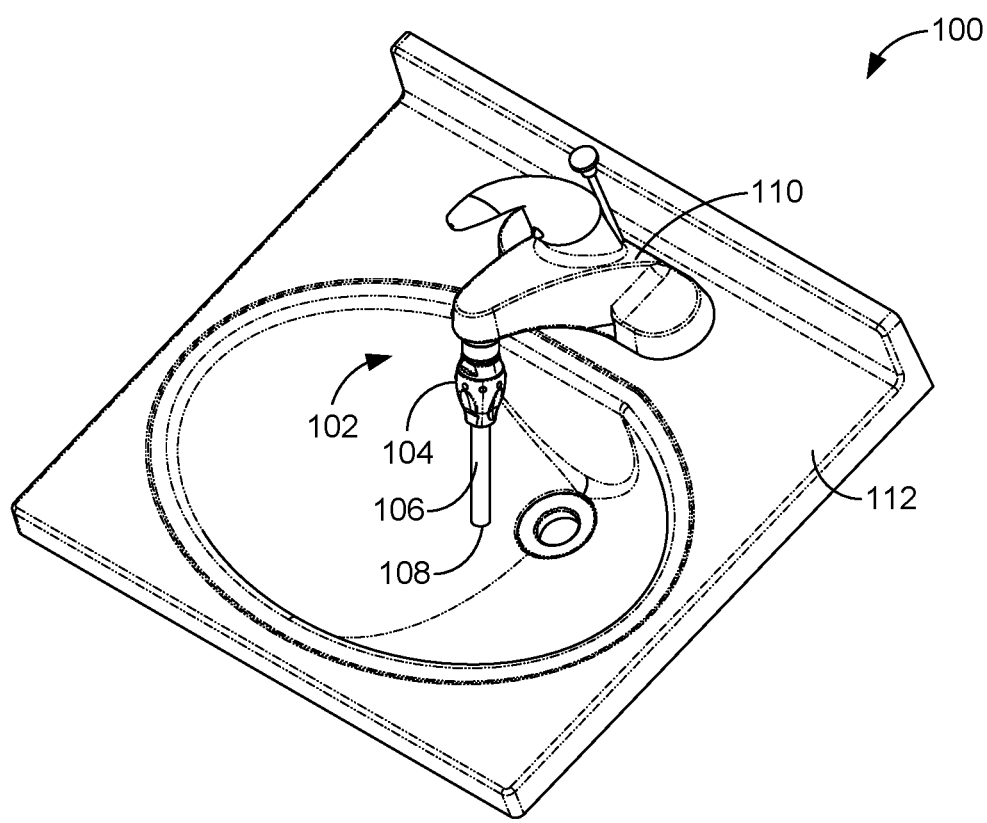
FIGS. 1A-1D illustrate a bath faucet with a detachable assembly that allows a hose to be attached to the faucet according to various embodiments of the present disclosure.

The drawings illustrate only example embodiments and are therefore not to be considered limiting of the scope of the embodiments described herein, as other embodiments are within the scope of this disclosure. The elements and features shown in the drawings are not necessarily drawn to scale, emphasis instead being placed upon clearly illustrating the principles of the embodiments. Additionally, certain dimensions or positionings may be exaggerated to help visually convey certain principles. In the drawings, similar reference numerals between figures designate like or corresponding, but not necessarily the same, elements.

DETAILED DESCRIPTION

Kitchen and bath faucets do not have a connection for attaching hoses and tubes. The embodiments described herein are directed to an assembly for connecting hoses, such as garden hoses, and others hoses, to faucets such as the ones found in kitchen and bathroom sinks that do not have threaded ends. Garden hoses can be connected to a hose bib or a faucet located on the outside of homes via threaded ends or some laundry tub faucets located on the hose that mate with a threaded connector on the hose bib. However, bathroom and kitchen faucets usually do not have such a threaded connector designed to mate with the threaded end of a hose. A detachable faucet connector can facilitate coupling the hose to a fixture, such as a faucet, a hose bib, or some other water dispensing plumbing fixture.

With reference to FIG. 1, shown is a perspective view of the plumbing environment 100 according to various embodiments of the present disclosure. The plumbing environment 100 includes a detachable faucet connector 102 that facilitates a hose 106 having a hose connector 104 to be attached to faucet 110. The faucet 110 is mounted on a bath sink 112. In some embodiments, hose 106 is a standard garden hose. It is understood that the detachable faucet connector 102 can attach to various other faucets. In some embodiments, the hose 106 has an attachment on one end 108. The attachment can be a handheld sprayer, a sprinkler system, a pressure washer, or some other attachment. The hose 106 can be attached to the detachable faucet connector 102 using the hose connector 104.

Figure 1B:
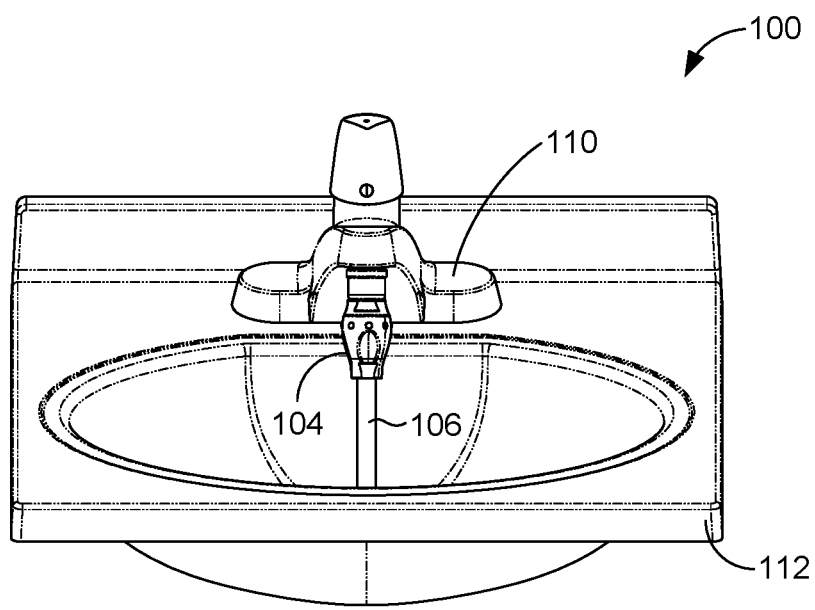

With reference to FIG. 1B, shown is a front view of the plumbing environment 100 according to various embodiments of the present disclosure. The hose 106 can be flexible enough to bend outward from the bath sink 112. The hose can be constructed of flexible PVC, LDPE, LLDPE, nylon, TPE, TPR, or other extruded materials. As an example, the hose 106 can attach to the faucet 110 at one end and have an attachment coupled to another end further away from the faucet and outside of the bath sink 112, such as twenty five feet, fifty feet, one hundred feet, or some other distance.

Figure 1C:
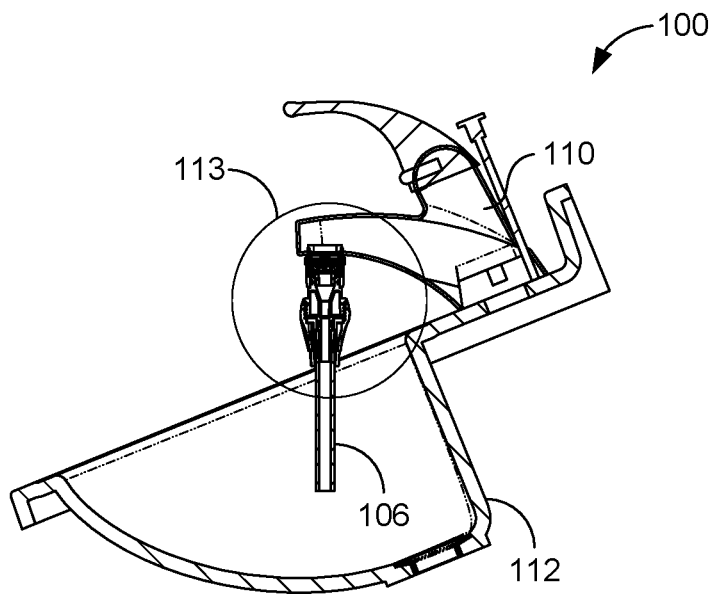

With reference to FIG. 1C, shown is a cross-sectional view of the plumbing environment 100 according to various embodiments of the present disclosure. The plumbing environment 100 includes a section 113 showing a cross section of the detachable faucet connector 102 coupled to the hose connector 104 and the faucet 110. Each of the faucet 110, the detachable faucet connection 102, the connector 104, and the hose 106 have an aperture passing through a center. When connected together, these elements facilitate water passing through the apertures from the faucet 110 through the hose 106.

Figure 1D:
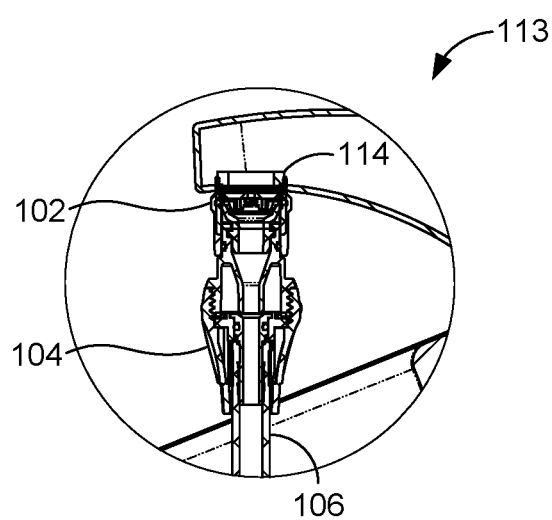

With reference to FIG. 1D, shown is a perspective view of section 113 according to various embodiments of the present disclosure. The faucet 110 can include a connector 114 which engages with detachable faucet connector 102.

With reference to FIG. 2A, shown is a coupled perspective view of the detachable faucet connector 102 according to various embodiments of the present disclosure. The detachable faucet connector 102 is coupled to a connector 104 which is coupled to a pipe or hose 106.

With reference to FIG. 2B, shown is a decoupled perspective view of the detachable faucet connector 102 according to various embodiments of the present disclosure. The detachable faucet connector 102 includes the aerator 202 (e.g., a fitting) and the hose adapter 204. The aerator 202 can be removably attached to the faucet 110. In certain circumstances, faucets, such as faucet 110 (FIG. 1), are provided with an aerator that is screwed onto the connector 114 in the faucet 110. The aerator 202 can be screwed onto the faucet 110 after removing any existing aerator and screwing the aerator 202 via the connector 114. In certain embodiments, the connector 114 can have screw threads that engage with a corresponding male screw thread. In various embodiments, detachable faucet connector 102 is provided with O-ring 206 that prevents water from leaking between the detachable faucet connector 102 and the faucet 110 when connected. An O-ring 208 can prevent water from leaking between the aerator 202 and the hose adapter 204.

With reference to FIG. 2C, shown is a side view of the detachable faucet connector 102 according to various embodiments of the present disclosure.

With reference to FIG. 2D, shown is a cross sectional side view of the detachable faucet connector 102 according to various embodiments of the present disclosure. The hose coupler 104 can couple the hose 106 to the hose adapter 204. The hose coupler 104 can be permanently attached to hose 106. The hose 106 can be removably attached to hose adapter 204 or a hose bib. The hose coupler 104 can be a standard threaded connector, such as a ¾ NPT or GHT connector or other connectors. The hose 106 can be attached to the hose coupler 104 using a rotatable connector. The rotatable connector can allow the hose 106 to rotate while still remaining connected to the hose coupler 104. In certain embodiments, hose 106 is attached to hose coupler 104 using a swivel connector allowing hose 106 to swivel while still remaining connected to hose connector 106. In some embodiments, hose 106 is a flexible hose.

Figure 3A:
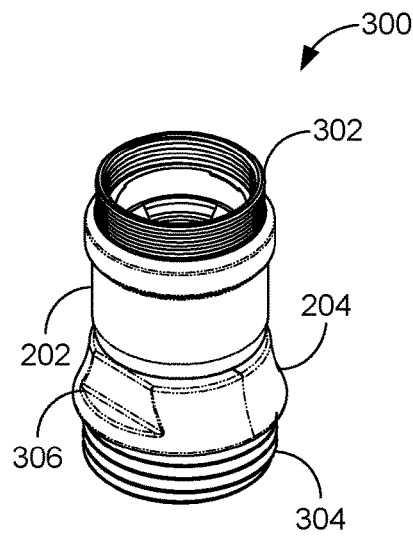
FIGS. 3A-3D illustrate a representative detachable faucet connector according to various embodiments of the present disclosure.

With reference to FIG. 3A, shown is a perspective view of a portion 300 of the detachable faucet connector 102 according to various embodiments of the present disclosure. The portion 200 includes an aerator 202 and a hose adapter 204. The aerator 202 can include a threaded connector 302 with threads on its outer surface. The threads of the threaded connector 302 can engage with threads of the connector 114 located in the faucet 110. The aerator 202 can be screwed on to a standard faucet such as the one in baths or kitchen sinks after the removal of the existing aerator in those faucets. In various embodiments, the aerator 202 is made of a metal, such as brass or zinc, metal alloy, plastic such as ABS, POM, CPVC, or other material.

The hose adapter 204 can include a fastener to removably attach the hose 106 via a hose connector 104. The fastener can be a threaded fastener 304. The hose adapter 204 may also include one or more grooves, such as a groove 306, which allow a wrench, or similar tool, to easily grip hose adapter. The groove 306 can facilitate the connection or removal of the hose adapter 204 from either the aerator 202 or the hose connector 104.

Figure 3B:
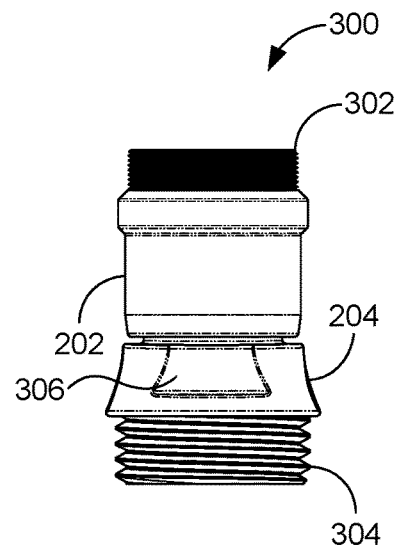
Figure 3C:
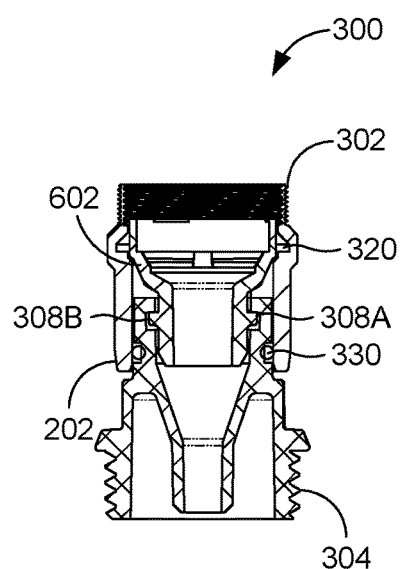

With reference to FIG. 3B, shown is a side view of the portion 300 of the detachable faucet connector 102 according to various embodiments of the present disclosure. With reference to FIG. 3C, shown is a cross-sectional view of the portion 300 of the detachable faucet connector 102 according to various embodiments of the present disclosure. The portion can include a funnel 602. The funnel 602 can be inserted into aerator 202. The ears 308A and 308B can engage with corresponding engaging members in the funnel 602 to securely latch the hose adapter 204 to the funnel 602, while still allowing quick release. The O-rings 320 and 330 can be included in detachable faucet connector 102. The O-ring 320 can be located between the aerator 202 and the funnel 602, while the O-ring 330 can be located between the aerator 202 and the hose adapter 204. The O-rings 320 and 330 can provide a waterproof seal to avoid water leaking when under pressure.

Figure 3D:
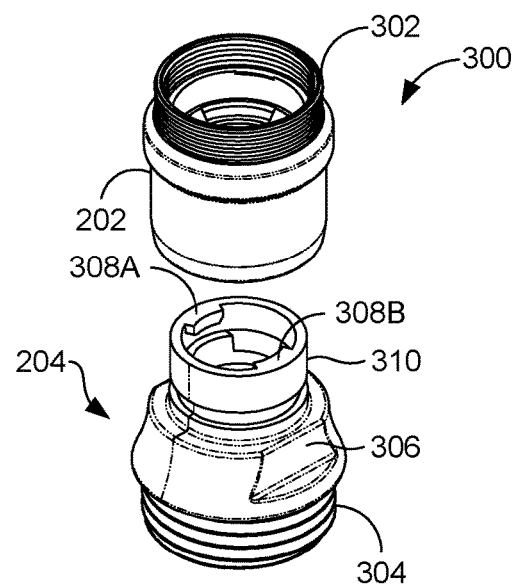

With reference to FIG. 3D, shown is an exploded view of the portion 300 of the detachable faucet connector 102 according to various embodiments of the present disclosure. The aerator 202 can be screwed to the faucet 110 to facilitate the connection and removal of the hose adapter 204. In other words, the aerator 202 can be attached to the faucet 110 even if the hose adapter 204 is not attached to the aerator 202 and the faucet 110 can be used in its normal operation. The hose adapter 204 can be removably attachable to the aerator 202.

The hose adapter 204 can include one or more ears 308A and 308B. The ears 308A and 308B can include protrusions extending radially inwards from the inner surface of the wall 310 at one end of the hose adapter 204. The wall 310 can be a hollow cylinder that is inserted into the aerator 202. The outer radius of the wall 310 can be slightly smaller than the inner radius of the opening at the bottom of aerator 202 to provide a friction-based fit.

Figure 4A:
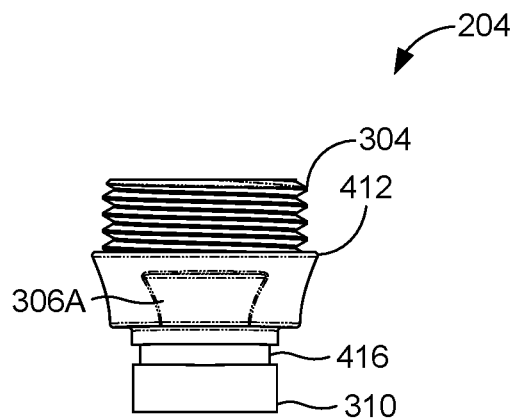
FIGS. 4A-4D illustrate a hose adapter used with a detachable faucet connector according to various embodiments of the present disclosure.

With reference to FIG. 4A, shown is a side view of a hose adapter 204 used with a detachable faucet connector 102 according to various embodiments of the present disclosure. The hose adapter 204 includes a threaded connector 304 that engages with threads on one end of the hose connector 104. The threads on the threaded connector 304 are on the other surface of the hose adapter 204 and are used to screw on to the hose connector 104, which has corresponding threads on its inner surface. In various embodiments, the threaded connector 304 has threads that engage with threads on the female end of a standard garden hose. The hose adapter 204 also includes one or more grooves 306A and 306B, which allow a wrench or similar tool, to easily grip hose adapter to facilitate its connection or disconnection from either the aerator 202 or the hose connector 104.

Figure 4B:
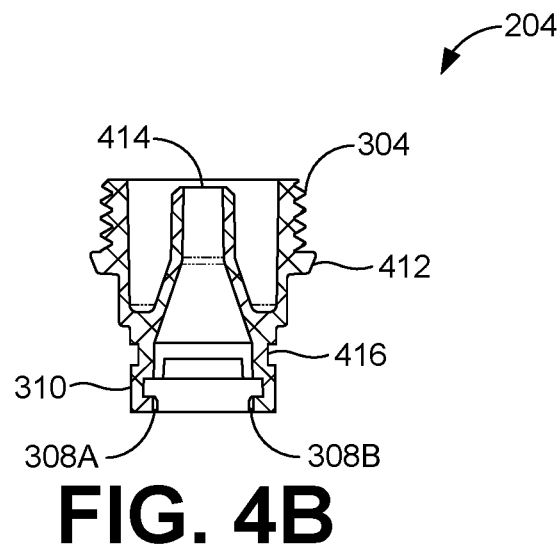

With reference to FIG. 4B, shown is a cross-sectional view of the hose adapter 204 used with a detachable faucet connector 102 according to various embodiments of the present disclosure. As discussed above, the hose adapter 204 can detachably connect to the aerator 202. The hose adapter 204 can include one or more ears, such as ear 308A and ear 308B. The ears 308A and 308B can extend inwards and latch on to a surface in the aerator 202. The ears 308A and 308B can be located on the top edge of the wall 310 which extends in to the aerator 202. In various embodiments, the hose adapter 204 includes a groove 416. The groove 416 can seat an O-ring 330 to provide a secure water tight seal between the hose adapter 204 and the aerator 202.

In various embodiments, the hose adapter 204 can include a protrusion 412 at the base of the threaded connector 304. The protrusion 412 can prevent over tightening of the hose connector 104 on the hose adapter 204. The inner dimension 414 of the hose adapter 204 can be narrow down at one end to direct the water flow.

Figure 4C:
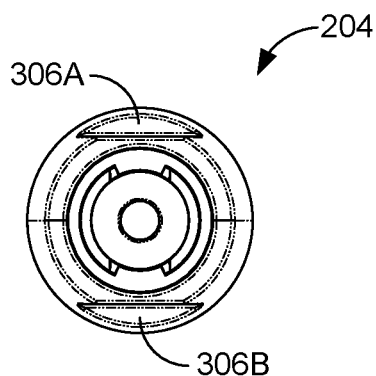

With reference to FIG. 4C, shown is a bottom view of the hose adapter 204 used with a detachable faucet connector 102 according to various embodiments of the present disclosure. The hose adapter 204 can be made of a metal; metal alloy, such as brass or zinc; plastic, such as ABS, CPVC, POM; or any other material suitable for this type of application.

Figure 4D:
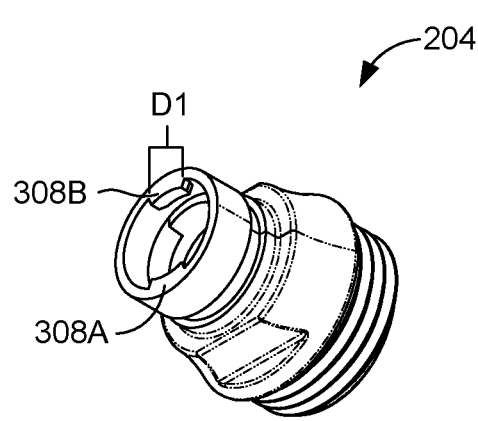

With reference to FIG. 4D, shown is a perspective view of the hose adapter 204 used with a detachable faucet connector 102 according to various embodiments of the present disclosure. The ears 308A and 308B can have a width D1.

Figure 5A:
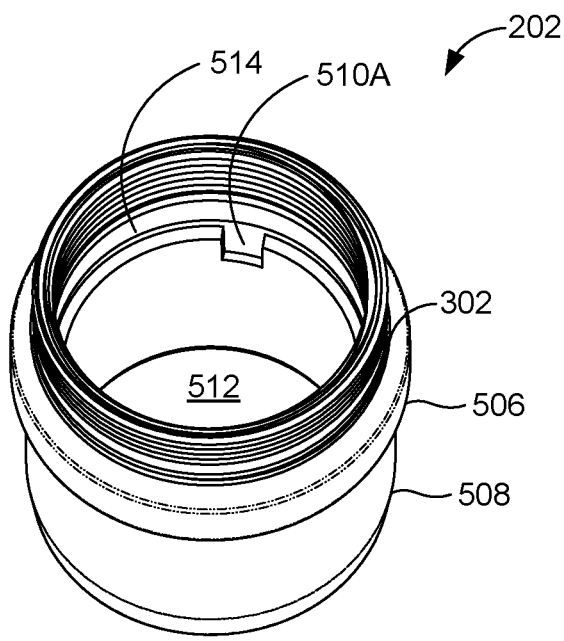
FIGS. 5A-5D illustrate an aerator used with a detachable faucet connector according to various embodiments of the present disclosure.

With reference to FIG. 5A, shown is a perspective view of an aerator 202 used with a detachable faucet connector 102 according to various embodiments of the present disclosure. The aerator 202 (e.g., a fitting) includes a threaded connector 302, a lip 506, and a body 508. The body 508 can include one or more grooves 510A on an inner surface. The groove 510A can engage with a matching slot on the funnel 602 (FIG. 6) to prevent the funnel 602 from turning when inserted into the aerator 202. The aerator 202 includes a rim groove 514 which can hold an O-ring, such as O-ring 320 (FIG. 3C).

Figure 5B:
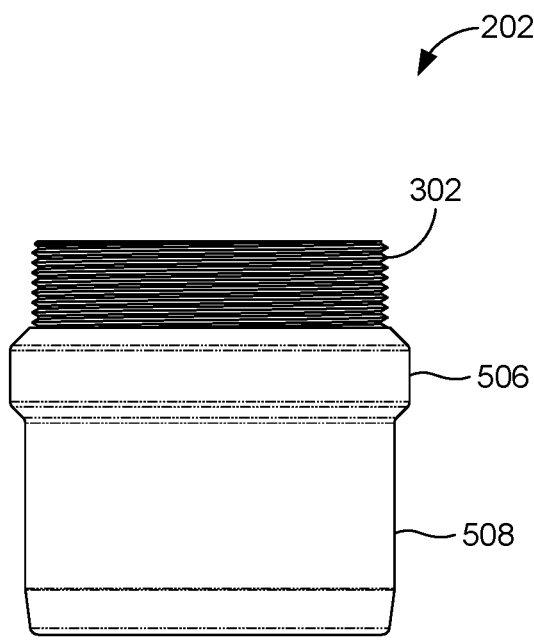

With reference to FIG. 5B, shown is a side view of the aerator 202 used with a detachable faucet connector 102 according to various embodiments of the present disclosure. The threaded connector 302 can have threads on an outer surface that correspond to threads on the inner portion of an opening in a faucet, such as connector 114. The lip 506 can have an outer diameter larger than the inner diameter of the threaded connector 302 so that the lip acts as a physical stop when the aerator 202 is screwed to a faucet.

Figure 5C:
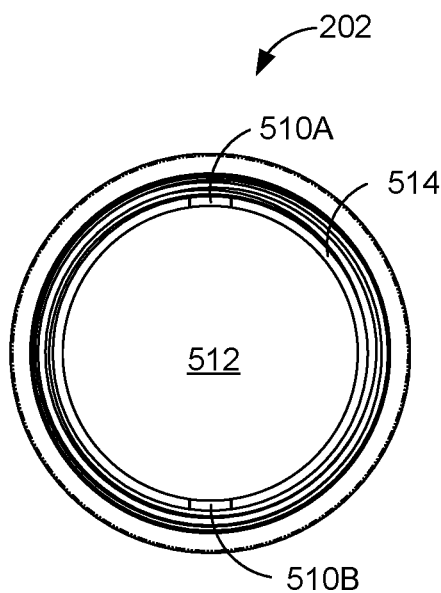

With reference to FIG. 5C, shown is a top view of the aerator 202 used with a detachable faucet connector 102 according to various embodiments of the present disclosure. The body 508 of aerator 202 can be a hollow cylinder with a hollow portion 512. The hollow portion 512 can have an inner diameter that is about the same or larger than the outer diameter of the wall 310 of the hose adapter 204.

The size of the inner diameter facilitates the wall 310 of the hose adapter 204 sliding in to the body 508 of the aerator 202. Additionally, the inner diameter of the hollow portion 512 can be smaller than the outer diameter of the top portion of the funnel 602 to prevent the funnel 602 from falling through the aerator 202 when the funnel 602 is inserted from the top of the aerator 202.

Figure 5D:
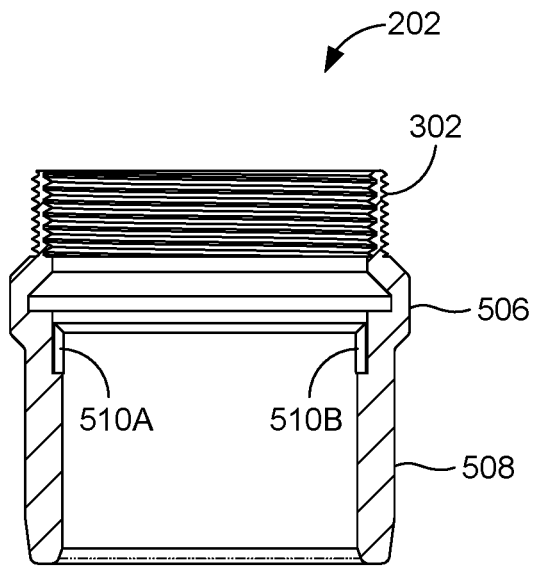

With reference to FIG. 5D, shown is a cross-sectional view of the aerator 202 used with a detachable faucet connector 102 according to various embodiments of the present disclosure.

Figure 6A:
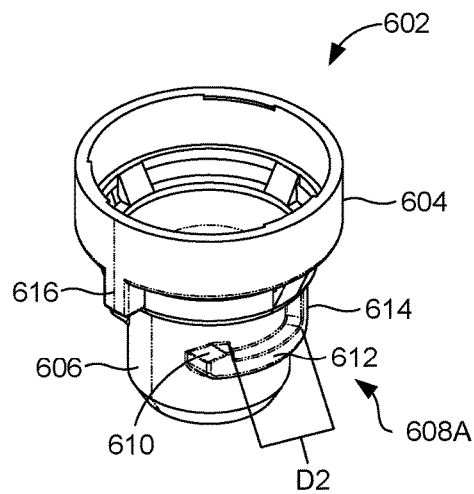
FIGS. 6A-6D illustrate a funnel used with a detachable faucet connector according to various embodiments of the present disclosure.

With reference to FIG. 6A, shown is a perspective view of a funnel 602 used with a detachable faucet connector 102 according to various embodiments of the present disclosure. The funnel 602 includes a top portion 604 and a bottom portion 606. The diameter of the top portion 604 can be larger than the diameter of the bottom portion 606. An outer diameter of the top portion 604 can be smaller or about equal to the inner diameter of the threaded connector 302 of the aerator 202. The funnel 602 can include one or more locks 608A on the surface of the bottom portion 606. The lock 608A can include a first end portion 610, a body portion 612, and a second end portion 614.

The first end portion 610 may be slightly thicker in width than the body portion 612. The body portion 612 can have substantially the same thickness throughout its length D2 that spans on the surface of the bottom portion 606. The body portion 612 can be substantially horizontal with respect to a vertical axis through the center of the funnel 602. The second end portion 614 can extend from the body portion 612 to the top of the bottom portion 606 where the bottom portion 606 meets the top portion 604. The lock 608A can provide resistance to prevent unintentional disengagement during use.

The length D2 of the body portion 612 can be substantially the same or larger than the length D1 of the ear 308, such that the ear 308 can rest on the body portion 612 when engaged. In order to engage the hose adapter 204 with the funnel 602, the wall 310 of the hose adapter 204 can be slid over the bottom portion 606 with the ears 308 radially turned to slide past the lock 608.

Figure 6B:
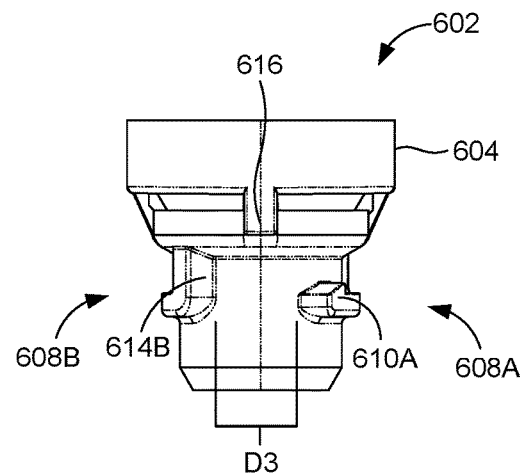

With reference to FIG. 6B, shown is a side view of the funnel 602 used with a detachable faucet connector 102 according to various embodiments of the present disclosure. The locks 608A and 608B can be located diametrically opposite to each other on the bottom portion 606. The locks 608A and 608B can engage with the ears 308A and 308B (FIG. 3) located on the hose adapter 204. The length of the ears 308 can be smaller than the length of opening D3 between the locks 608A and 608B allowing the ears 308A and 308B to slide past the opening between the locks 608A and 608B.

Once the funnel 602 is fully inserted into the hose adapter 204, the hose adapter 204 can be turned clockwise so that the ears 308 slide past and over first the end portion 610 to rest on the body portion 612. The second end portion 614 prevents the ears 308 from sliding off the lock 608 and locks the ear 308 in to place. The first end portion 610 can be slightly thicker than the body portion 612 to create a small barrier and prevent the ears 308 from easily disengaging from the lock 608. In order to disengage the ears 308 from the lock 608 and separate the hose adapter 204 from the funnel 602, the hose adapter 204 needs to be pushed in to the funnel 602 so that the ears 308 are lifted from the surface of the body portion 612 and are able to slide past the top of the first end portion 610. The hose adapter 204 can then be turned counter-clockwise to disengage from the funnel 602.

The funnel 602 can include one or more slots 616. The dimensions of the slot 616 can correspond to the dimensions of the groove 510 on the aerator 202 such that when the funnel 602 is placed inside the aerator 202, the slot 616 can lock in to the groove 510 to prevents the funnel 602 from turning inside the aerator 202.

Figure 6C:
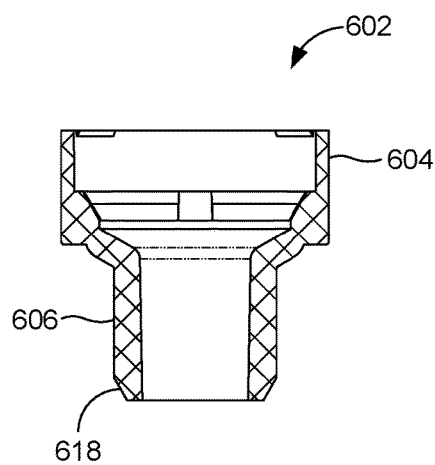

With reference to FIG. 6C, shown is a cross-sectional view of the funnel 602 used with a detachable faucet connector 102 according to various embodiments of the present disclosure. The funnel can have a beveled edge 618 on an outer bottom portion of the funnel 602.

Figure 6D:
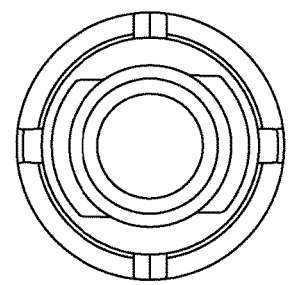

With reference to FIG. 6D, shown is a top view of the funnel 602 used with a detachable faucet connector 102 according to various embodiments of the present disclosure. The hose adapter 204 can be made of a metal, metal alloy, plastic, or any other material suitable for this type of application.

Figure 7A:
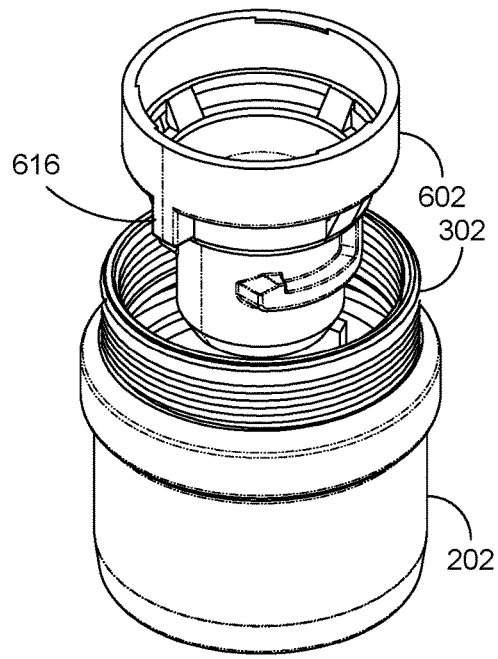
FIGS. 7A-7D illustrate an aerator and a funnel used with a detachable faucet connector according to various embodiments of the present disclosure.
Figure 7B:
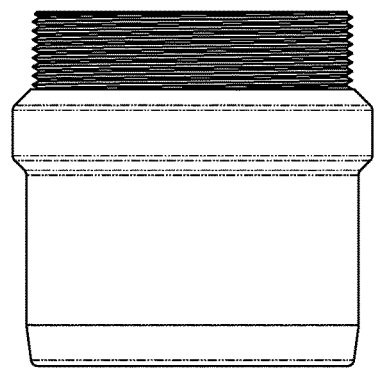
Figure 7C:
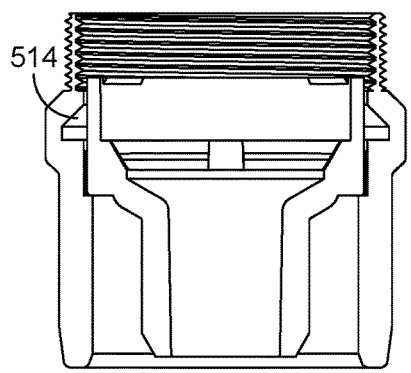
Figure 7D:
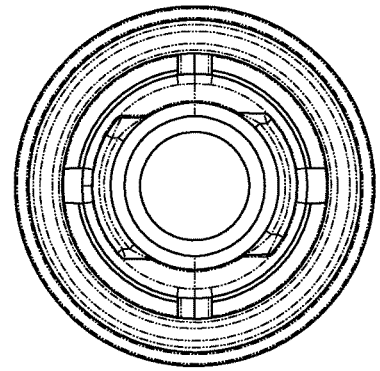

FIGS. 7A-7D illustrate an aerator 202 (e.g., a fitting) and a funnel 602 used with a detachable faucet connector 102 according to various embodiments of the present disclosure. FIG. 7A shows the funnel 602 being inserted in to the aerator 202. The funnel 602 can be inserted in to the aerator 202 from the open end near the threaded connector 302 of the aerator 202. Once fully inserted, the slot 616 of the funnel 602 can sit inside the groove 510 of the aerator 202. Further, an O-ring 320 (FIG. 3) can be placed inside the aerator 202 in the groove 514 prior to the funnel 602 being inserted to prevent water leakage.

Once the funnel 602 is placed inside the aerator 202, the aerator 202 can be screwed to the faucet 110. Then, the hose adapter 204 can be slid into the aerator 202 and twisted clockwise such that the ears 308A and 308B engage with the locks 608A and 608B. After the hose adapter 204 is attached to funnel 602, the hose 106 can be connected to the hose adapter 204. As can be appreciated, if ears were reversed, a counter-clockwise action would be necessary to engage the locks. The aerator 202, the funnel 602, and the hose adapter 204 can be hollow cylindrical shaped structures that each have one or more outer dimensions, one or more inner dimensions, and one or more thicknesses.

Figures 8A, 8B:
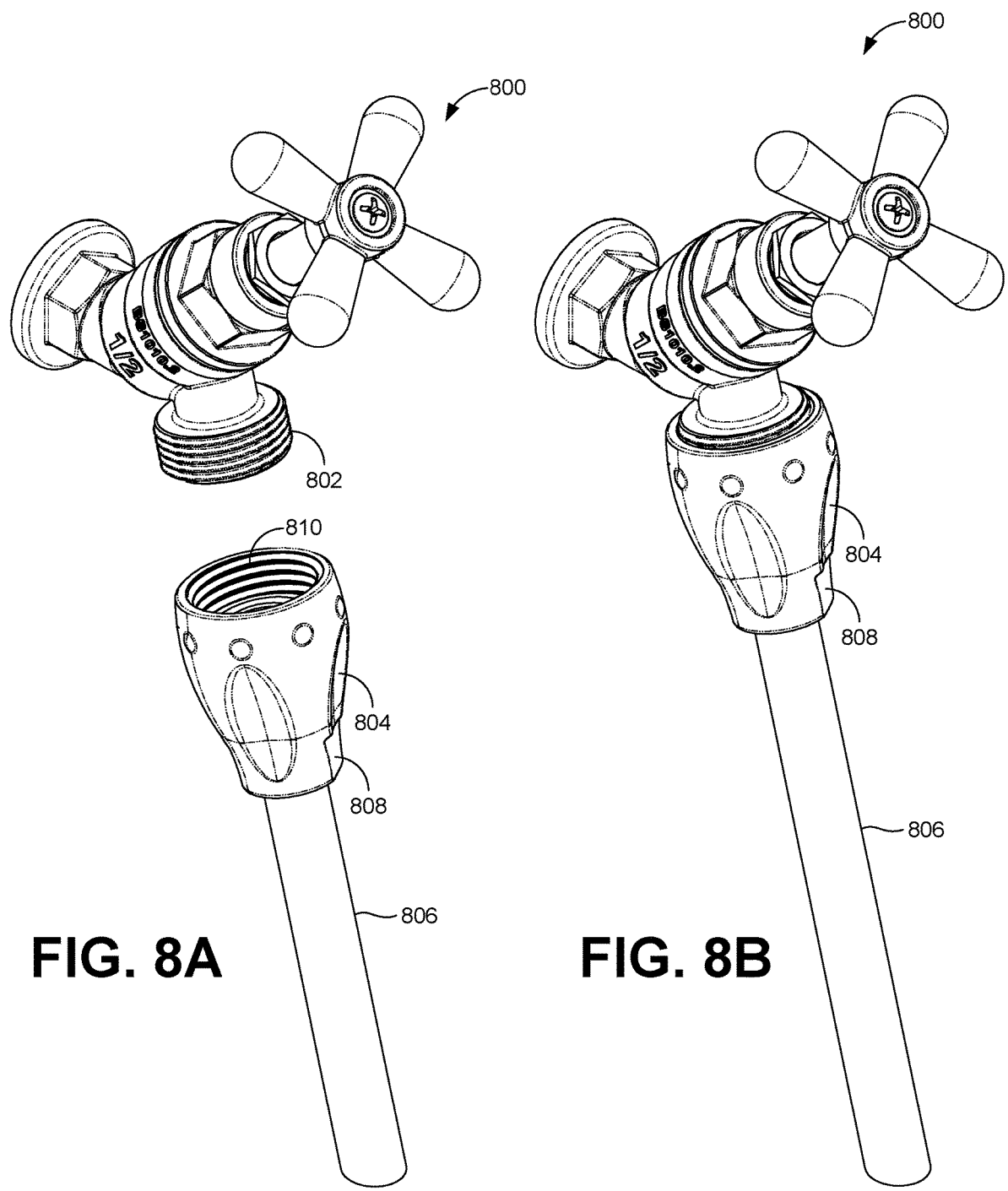
FIGS. 8A and 8B illustrate a hose bib connecting to a hose according to various embodiments of the present disclosure.

FIGS. 8A-8B illustrate a hose bib 800 connecting to a hose according to various embodiments of the present disclosure. The hose bib 800 has threads 802 that are mated with threads 810 to fasten the hose 806 using the hose connector 804. The hose connector 804 can have a rotating connector 808. The rotating connector 808 can rotate while still attached to the hose connector 804. The hose connector 804 can be a hose connector 104 (FIG. 1) and the hose 806 can be a hose 106 (FIG. 1).

Figure 9A:
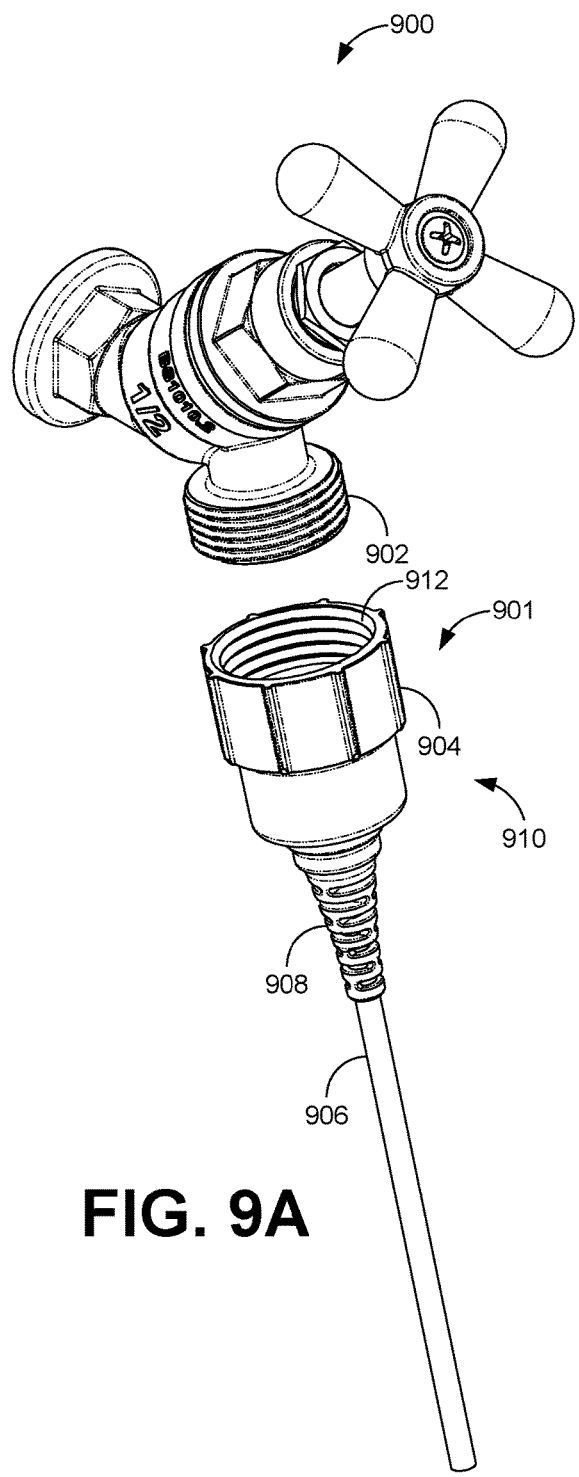
FIGS. 9A and 9B illustrate a hose bib connecting to a hose according to various embodiments of the present disclosure.
Figure 9B:
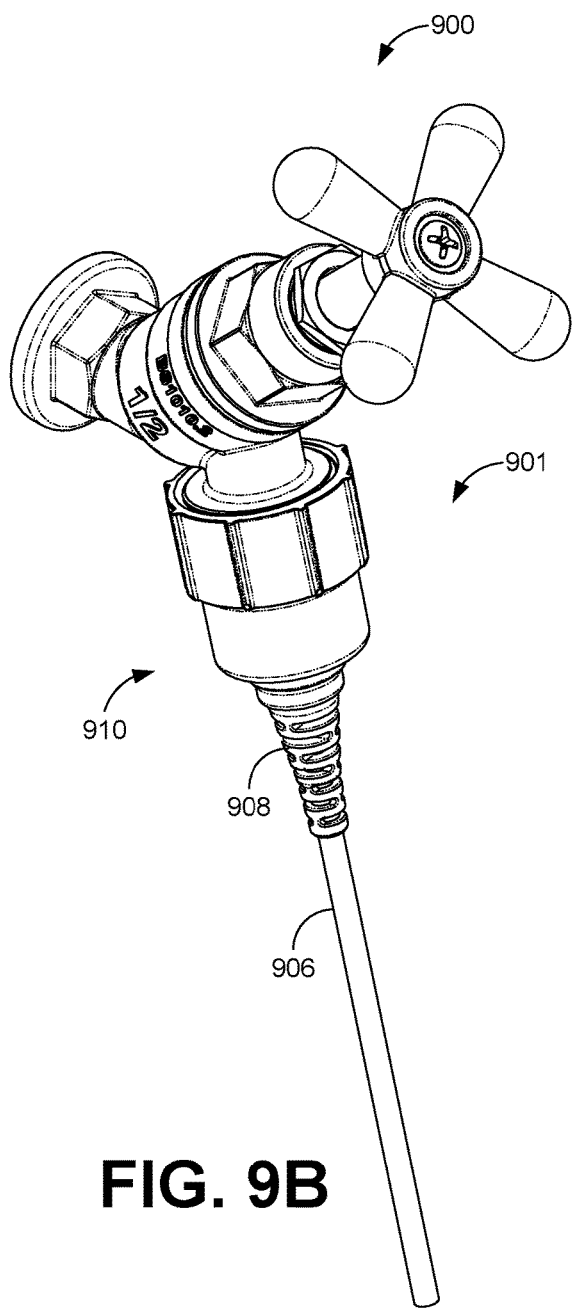

FIGS. 9A-9B illustrate a hose bib 900 connecting to a hose coupling structure 901 including a hose 906 according to various embodiments of the present disclosure. The hose bib 900 has threads 902 that can mate with the threads 912 to fasten hose 906 using hose connector 904 of the hose coupling structure 901. The hose 906 has a diameter that is smaller than the diameter of the opening of the hose bib 902 or the hose connector 904. The diameter disparity can create a higher pressure for the water flowing through the hose 906. The hose 904 can have flexible portion 908 coupled to the hose end 910. A sprayer attachment can be coupled to the other end of the hose 906 to spray water. The other end of the hose can be used without any attachment. The other end of the hose can have a threaded connector allowing other threaded attachments to be fastened to the hose 906. The hose coupling structure 901 can be used to create a higher pressure stream that can be used to pressure wash.

The hose 906 and hose end 910 may be over molded into a single part. The hose 906 and hose end 910 may be constructed of similar materials such as LDPE, LLDPE, Flexible PVC, TPE, TPR or other materials. The hose 906 can be flexible tube. The hose 906 can be to clean out sink and tub drains using the higher water pressure. A diameter of the hose 906 can be reduced to increase the water pressure in the hose to facilitate cleaning out drains. The small opening of the tube focuses the water pressure providing a tight pressurized flow pattern that may be used to help clean items (e.g. paint brushes, parts) or remove obstructions (e.g. hair or sludge in drain lines).

Figure 10A:
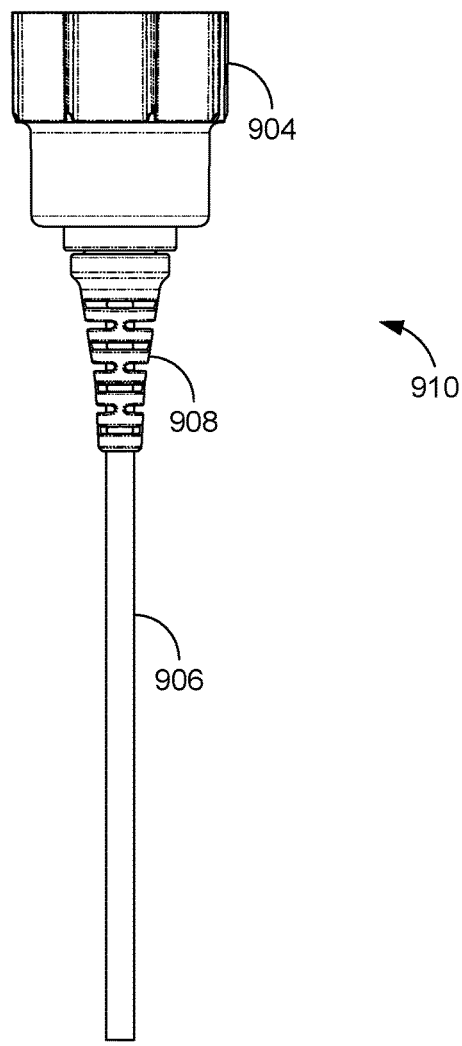
FIGS. 10A-10D illustrate a hose adapter connected to a hose according to various embodiments of the present disclosure.
Figure 10B:
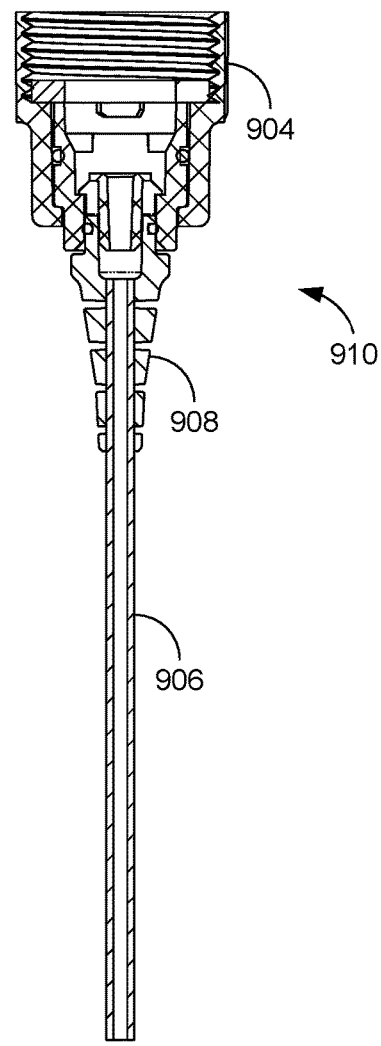
Figures 10C, 10D:
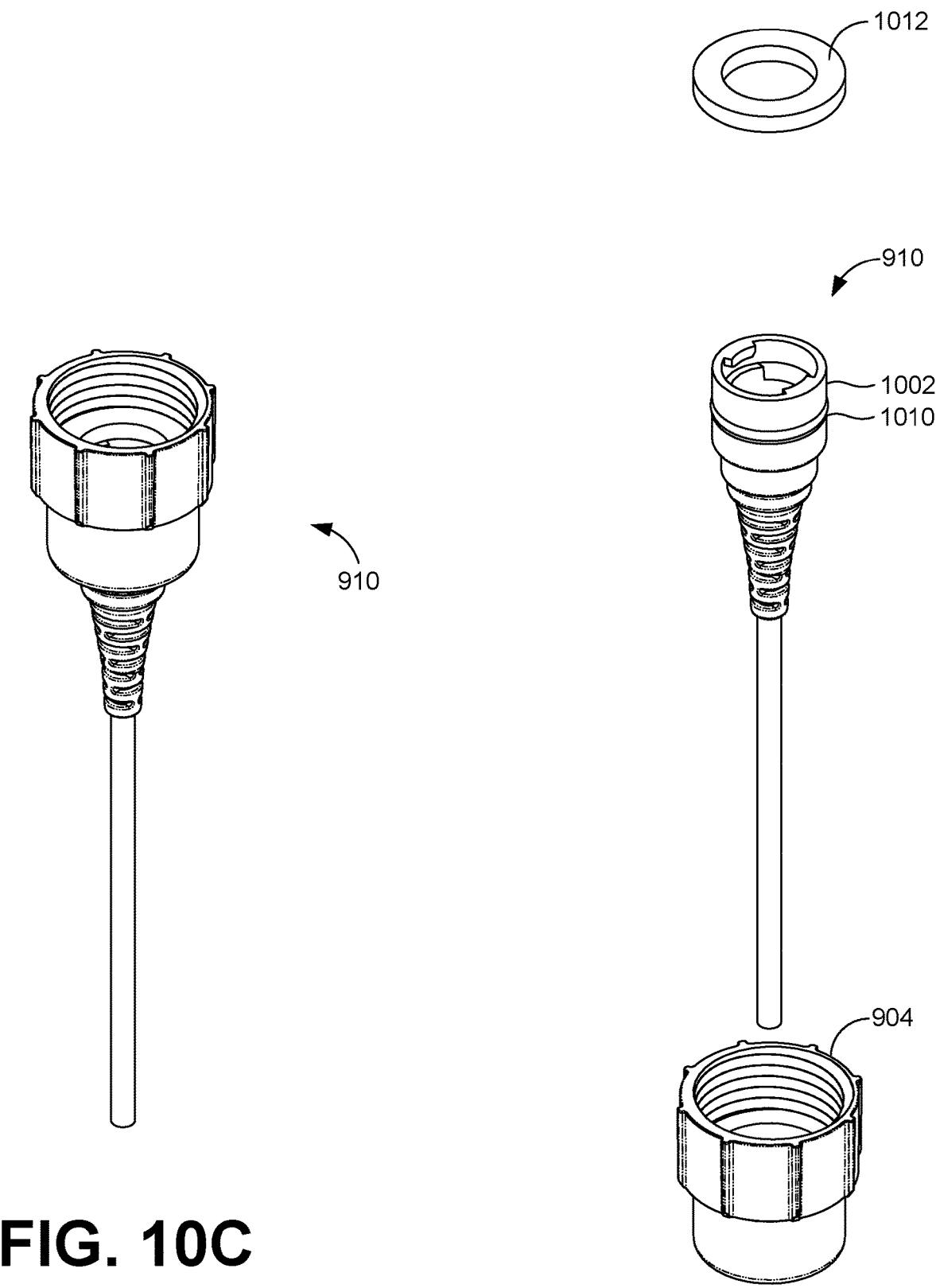

FIGS. 10A-10D illustrate a hose adapter connected to a hose 906 according to various embodiments of the present disclosure. The hose end 910 includes hose adapter 1002 that is attached to hose connector 908. FIG. 10D shows a hose connector 904 that slips up the hose 906 and over the hose end 910. The hose end 910 may be over molded as one part onto the hose 906. The O-ring 1010 is positioned on the hose end 910 to seal on the inside of the hose connector 904 or aerator 202 (FIG. 2). The hose washer 1012 is inserted into the hose connector 904 and provides a water tight connection between the assembly and the hose bib. The O-ring 1010 can be part of the finished assembly of the hose end 910 and the hose 906. The finished assembly can be inserted in to an aerator 202. The hose 906 with the hose adapter 1002 can facilitate the quick attachment of the hose 906 to a faucet that has an aerator, such as the aerator 202 with the funnel 602 (FIG. 6) preinstalled. In some embodiments, the hose 906 can be attached to a faucet using the hose adapter 1002 such that the hose connector 904 is not needed.

FIGS. 11A-11D illustrate a detachable faucet connector connected to a hose according to various embodiments of the present disclosure. The hose adapter 1002 can be inserted in to the aerator 202 with a funnel 602 (FIG. 6) placed inside. In some embodiments, the funnel 602 and the aerator 202 can be one single part. The single part can be a single molded part of plastic, such as LDPE, LLDPE, Flexible PVC, TPE, TPR, or other materials. In some embodiments, the single part can be a single metal or metal alloy part.

Figure 12A:
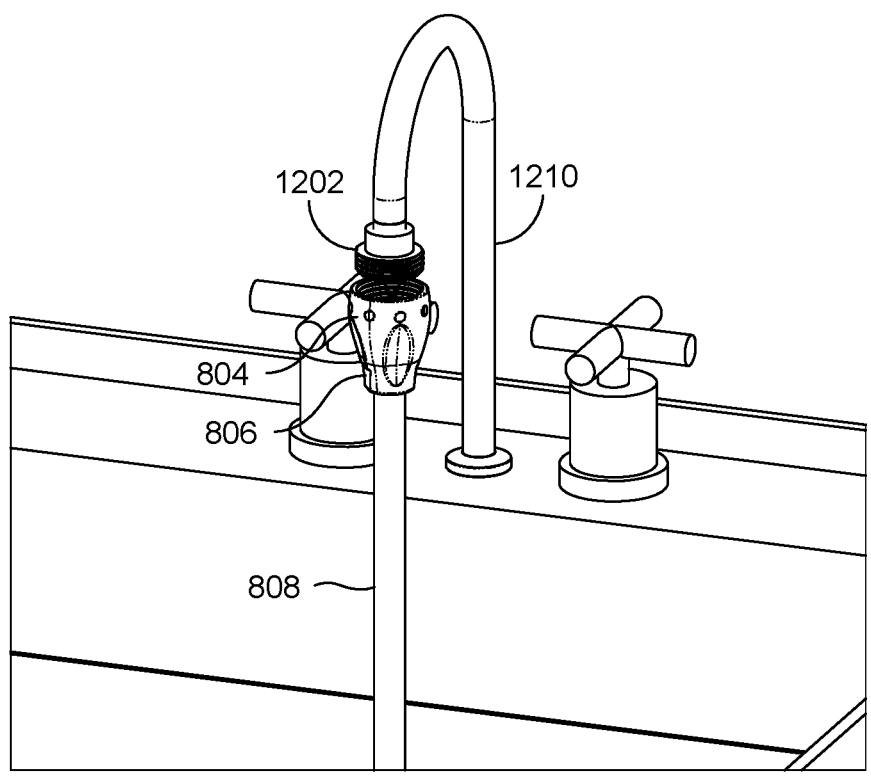
FIGS. 12A and 12B illustrate a detachable faucet connector connected to a hose and a kitchen faucet according to various embodiments of the present disclosure.
Figure 12B:
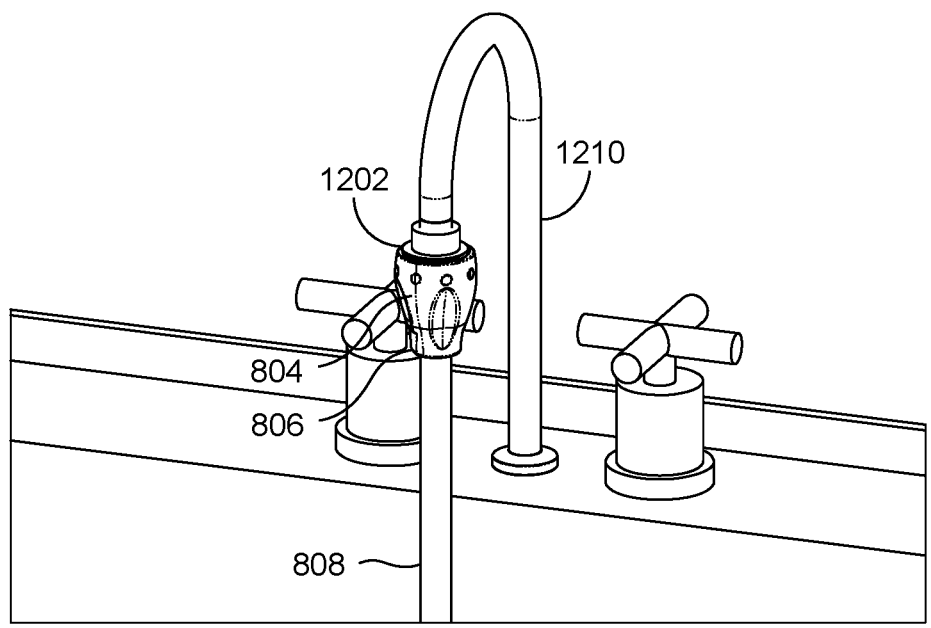

FIGS. 12A-12B illustrate a detachable faucet connector connected to a hose and a kitchen faucet according to various embodiments of the present disclosure. The hose connector 804 can be coupled to a faucet end 1202 of a faucet 1210.

Figure 13A:
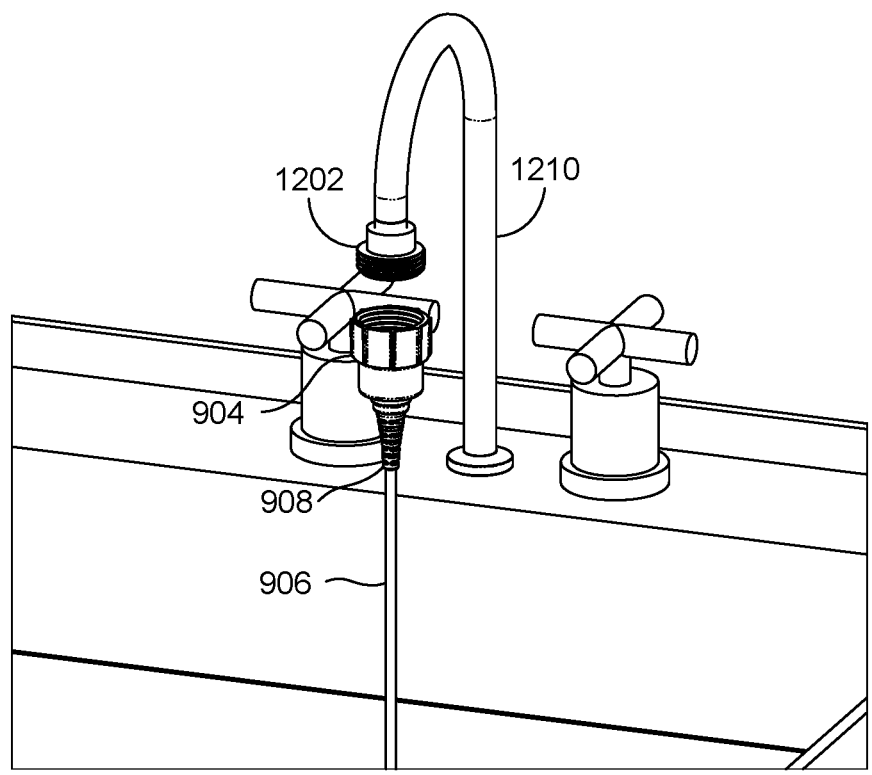
FIGS. 13A and 13B illustrate a detachable faucet connector connected to a hose and a kitchen faucet according to various embodiments of the present disclosure.
Figure 13B:
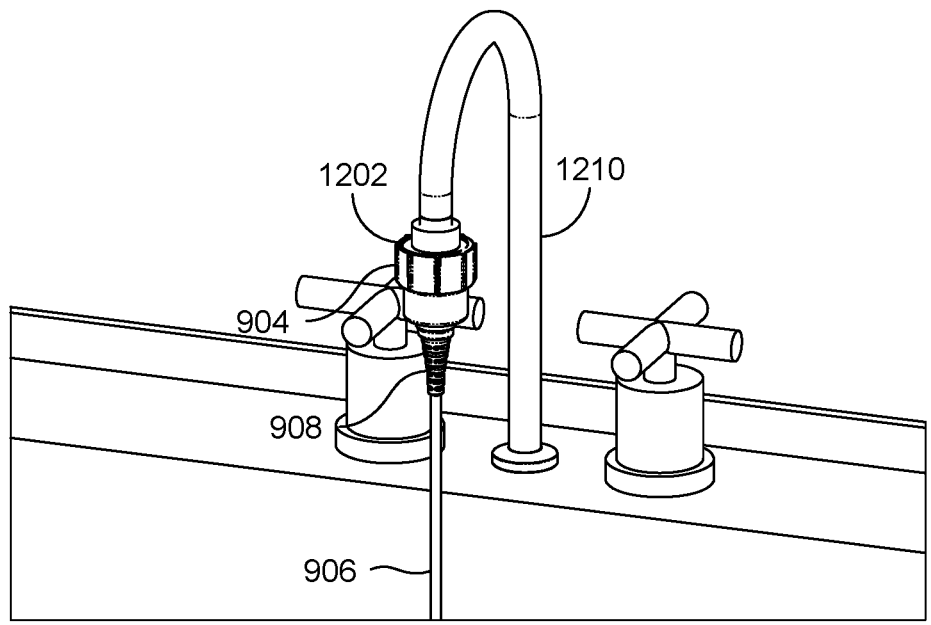

FIGS. 13A-13B illustrate a detachable faucet connector connected to a hose and a kitchen or laundry tub faucet according to various embodiments of the present disclosure. The hose connector 904 can be couple to a faucet end 1202 of a faucet 1210.

Figure 14A:
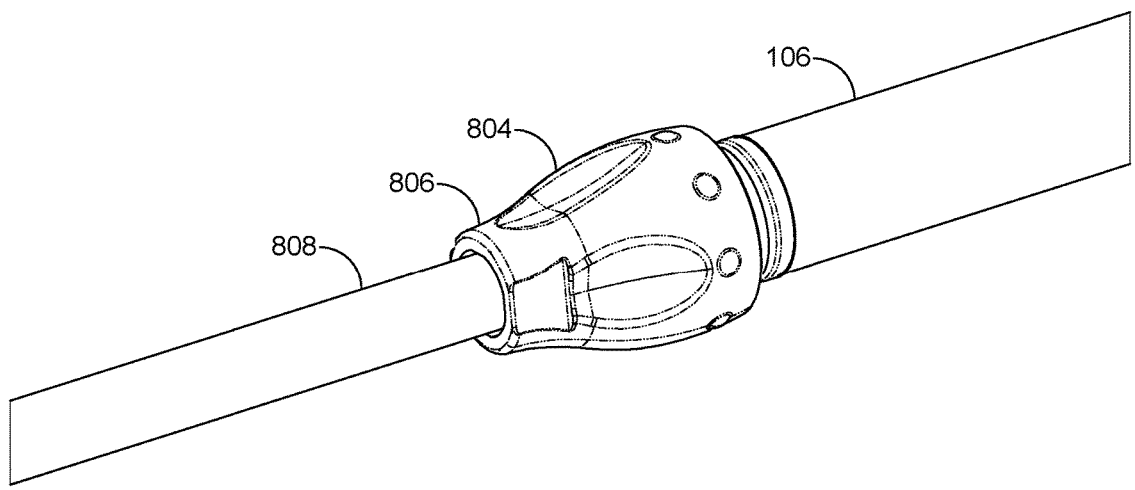
FIGS. 14A and 14B illustrate a detachable faucet connector connected to a hose according to various embodiments of the present disclosure.
Figure 14B:
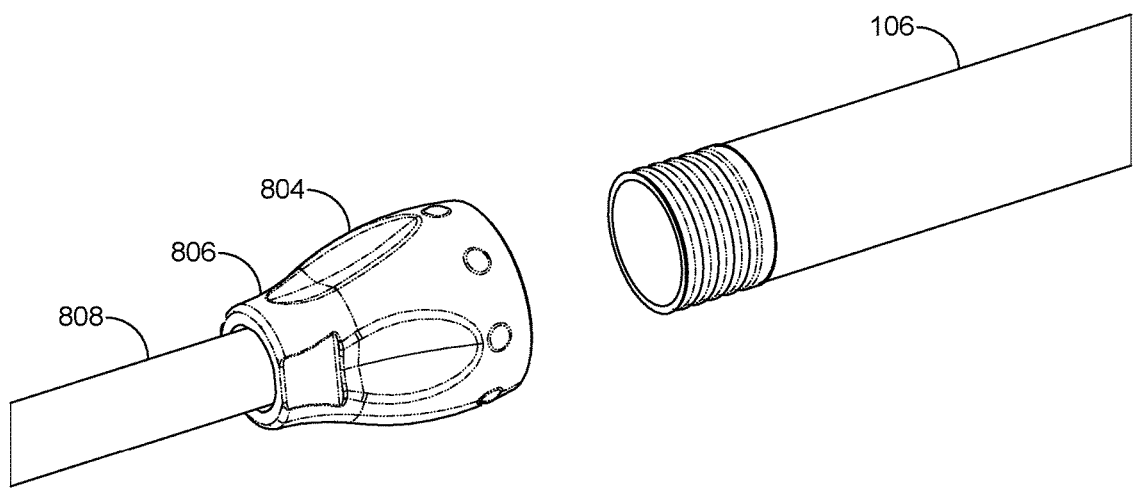

FIGS. 14A-14B illustrate a detachable faucet connector connected to a hose according to various embodiments of the present disclosure. The hose connector 804 can be coupled to an end of a hose 106.

Figure 15A:
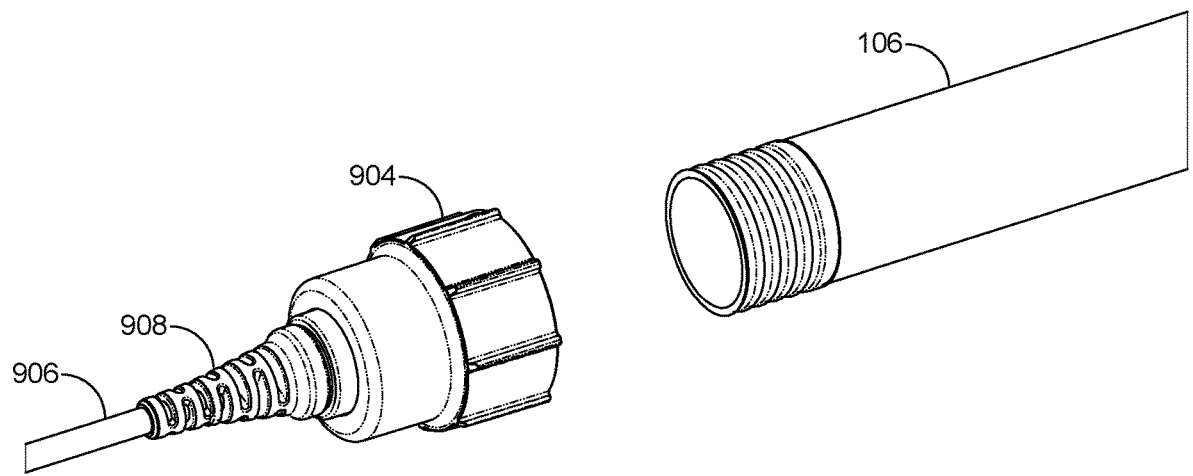
FIGS. 15A and 15B illustrate a detachable faucet connector connected to a hose according to various embodiments of the present disclosure.
Figure 15B:
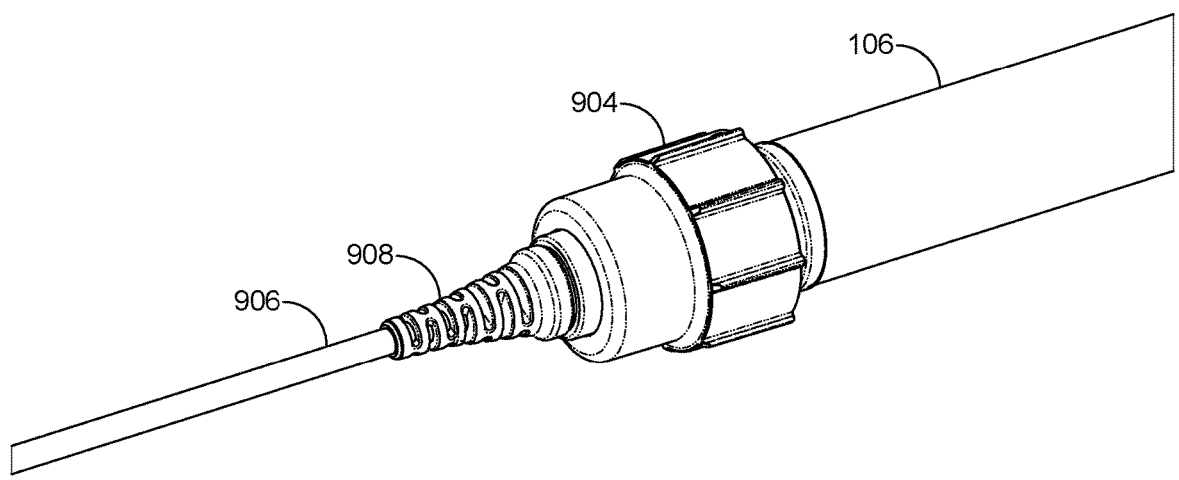

FIGS. 15A-15B illustrate a detachable faucet connector connected to a hose according to various embodiments of the present disclosure. The hose connector 904 can be coupled to an end of a hose 106.

Although embodiments have been described herein in detail, the descriptions are by way of example. The features of the embodiments described herein are representative, and in alternative embodiments, certain features and elements may be added or omitted. Additionally, modifications to aspects of the embodiments described herein may be made by those skilled in the art without departing from the spirit and scope of the present invention defined in the following claims, the scope of which is to be accorded the broadest interpretation so as to encompass modifications and equivalent structures.

At least the following is claimed:

1. A detachable faucet connector, comprising:
  a fitting configured to couple to a faucet;
  a funnel configured to be secured within the fitting, wherein the funnel comprises a top portion and a bottom portion, the funnel comprises a lock situated on an exterior side surface of the bottom portion of the funnel, the lock including a first end, a second end, and a body portion that extends from the first end to the second end, and the second end extending closer to the top portion of the funnel than the first end, wherein the first end has a thicker width along a length of the funnel than the body portion, and the second end extends from the body portion of the lock to the top portion of the funnel; and
  a hose adapter that comprises an ear, the hose adapter being configured to couple to the funnel by engaging the ear with the lock, the ear having a smaller arc length than the body portion of the lock.

2. The detachable faucet connector of claim 1, wherein the fitting is a hollow cylindrical shape and comprises a first portion and a second portion, the first portion comprising threads for engaging with an inner surface of the faucet.

3. The detachable faucet connector of claim 2, wherein the funnel comprises a top cylindrical hollow portion and a bottom cylindrical hollow portion, wherein the lock is situated on the exterior side surface of the bottom cylindrical hollow portion.

4. The detachable faucet connector of claim 1, wherein an inner surface of the fitting comprises at least one groove configured to engage at least one slot of the funnel, the at least one slot extends from the exterior side surface of the funnel.

5. The detachable faucet connector of claim 1, wherein the hose adapter comprises a threaded portion, the threaded portion configured to engage with a female threaded connector of a hose.

6. The detachable faucet connector of claim 5, wherein the hose is a flexible hose.

7. The detachable faucet connector of claim 6, wherein the hose is attached to a spray nozzle.

8. The detachable faucet connector of claim 7, wherein the hose is configured to be attached to the hose adapter via a rotatable coupling.

9. The detachable faucet connector of claim 1, wherein the hose adapter comprises a cylindrical portion and a body portion, an outer diameter of the cylindrical portion is substantially similar to an inner diameter of a portion of the fitting.

10. The detachable faucet connector of claim 9, wherein a hose coupled to the detachable faucet connector has a diameter smaller than the outer diameter of the cylindrical portion.

11. The detachable faucet connector of claim 1, wherein the ear is configured to contact the body portion of the lock.

12. A system comprising:
a faucet; and
a detachable faucet connector comprising:
    a fitting and a funnel configured to couple to the faucet, wherein the funnel comprises a top portion and a bottom portion, the funnel comprises a lock situated on an exterior side surface of the bottom portion of the funnel, the lock including a first end, a second end, and a body portion that extends from the first end to the second end, wherein the first end has a thicker width along a length of the funnel than the body portion and the second end extends from the body portion of the lock to the top portion of the funnel; and
    a hose adapter configured to couple to the fitting and the funnel, wherein the hose adapter is coupled to the funnel by the lock.

13. The system of claim 12, wherein the faucet comprises a plurality of threads configured to couple to the fitting by screwing the fitting onto an end of the faucet.

14. The system of claim 12, further comprising a hose, the hose adapter configured to couple to the hose.

15. The system of claim 12, wherein the hose adapter comprises an ear that is configured to contact the body portion of the lock.

* * * * *